United States Patent [19]
Giere et al.

[11] Patent Number: 5,940,251
[45] Date of Patent: Aug. 17, 1999

[54] HEAD SUSPENSION WITH DYNAMIC VIBRATION ABSORPTION EXTENSION

[75] Inventors: Scott C. Giere; Daniel D. Willard; Robert B. Evans, all of Hutchinson, Minn.

[73] Assignee: Hutchinson Technology, Inc., Hutchinson, Minn.

[21] Appl. No.: 08/979,891

[22] Filed: Nov. 26, 1997

[51] Int. Cl.[6] .................................................. G11B 21/21
[52] U.S. Cl. ............................................................ 360/104
[58] Field of Search ..................................... 360/104, 105, 360/106

[56] References Cited

U.S. PATENT DOCUMENTS

| | | | |
|---|---|---|---|
| 3,713,121 | 1/1973 | Fasano et al. | 360/105 |
| 4,760,478 | 7/1988 | Pal et al. | 360/104 |
| 5,187,625 | 2/1993 | Blaeser et al. | 360/104 |
| 5,299,081 | 3/1994 | Hatch et al. | 360/104 |
| 5,796,553 | 8/1998 | Tangren | 360/104 |

FOREIGN PATENT DOCUMENTS

| | | |
|---|---|---|
| 1-92975 | 4/1989 | Japan . |
| 3-71476 | 3/1991 | Japan . |
| 3-278382 | 12/1991 | Japan . |
| 5-325459 | 12/1993 | Japan . |
| 6-124424 | 5/1994 | Japan . |
| 2-15412 | 4/1998 | Japan . |
| WO 98/09275 | 3/1998 | WIPO . |

OTHER PUBLICATIONS

Shock and Vibration Handbook, Third Edition, by Cyril M. Harris, 1 page.
"Mechanical Vibration—$2^{nd}$ ed." Addison–Wesley Pub., pp. 465–468.

*Primary Examiner*—David D. Davis
*Attorney, Agent, or Firm*—Faegre & Benson LLP

[57] ABSTRACT

A head suspension including a load beam and flexure having a vibration absorbing member for vibrating at resonance mode vibrations of the head suspension. The load beam includes a mounting region at a proximal end, a rigid region adjacent to a distal end, and a spring region between the mounting region and the rigid region. The flexure is at the distal end of the load beam and is for supporting a head slider. The vibration absorbing member extends from the head suspension and has a resonance mode frequency substantially the same as one of the resonance mode frequencies of the head suspension. As such, the vibration absorbing member absorbs energy on the head suspension at a resonance mode frequency thereof, acting to reduce gain at a resonance mode frequency of the head suspension.

22 Claims, 15 Drawing Sheets

HEAD SUSPENSION WITH DYNAMIC VIBRATION ABSORPTION EXTENSION

BACKGROUND

1. Technical Field

The present invention relates generally to head suspensions for supporting read/write heads over recording media. In particular, the present invention is directed to head suspensions having vibration absorption structures particularly effective at resonance frequencies.

2. Background of the Invention

Head suspensions are well known and commonly used within dynamic magnetic or optical information storage devices or drives with rigid disks. The head suspension is a component within the disk drive which positions a magnetic or optical read/write head over a desired position on the storage media where information is to be retrieved or transferred. Head suspensions for use in rigid disk drives typically include a load beam that generates a spring force and supports a flexure to which a head slider supporting a read/write head is to be mounted. The load beam typically includes a base at a proximal end, a rigid region at a distal end, and a spring region between the rigid region and the base for providing the spring force. The head slider is aerodynamically designed so as to allow the read/write head to "fly" on an air bearing generated by the spinning magnetic or optical storage disk against the opposing spring force. The flexure permits pitch and roll motion of the head slider and read/write head as they move over the data tracks of the disk. Head suspensions are normally combined with an actuator arm to which the base of the load beam is mounted so as to position (by linear or rotary movement) the head suspension, and thus the head slider and read/write head, with respect to data tracks of the rigid disk.

With the advent of more powerful computers and the rapid growth in the personal computer market, it has become increasingly more important to enable the user to store and access data to and from storage devices with increased speed and accuracy. Because of this need to reduce access times to enable rapid storage retrieval of data it has become increasingly more important to reduce undesirable levels of vibration of components within the rigid disk drive.

In relation to this, an important consideration in the design of head suspensions is resonance characteristics; that is, the head suspension's performance at its resonance frequencies. Resonance characteristics of a head suspension are particularly important because a head suspension is more sensitive to vibrations at a resonance frequency thereof than to vibrations at non-resonance frequencies. That is, if the servo system, or other portion of the ambient environment external to the head suspension and coupled to the head suspension via the actuator arm, is vibrating or causes vibration of the head suspension at a frequency at or near a resonance frequency of the head suspension, the resulting vibration of the head suspension will be at its resonance frequency. The amplitude of the movement of this vibration at the head slider will be greater than if the servo system, and therefore head suspension, were vibrating at a non-resonance frequency. That is, the gain (the ratio of the amplitude of the motion of a head suspension at the head slider to the amplitude of the motion input into a head suspension at its base) of a head suspension is significantly larger when the input motion is a vibration at a resonance mode frequency of the head suspension than when the input is a vibration at a non-resonance mode frequency thereof Further, if an impulse force is imparted to the head suspension, as opposed to an ambient vibration or electrically induced, vibration in the head suspension at resonance mode frequencies can naturally result. Such an impulse force could be caused by quickly stopping the head suspension over a data track to read or write information as well as by an externally applied force.

Because vibration of a head suspension at a resonance mode frequency can have large gain, such vibrations can cause delay in the read/write process. Specifically, vibrations of the head suspension at a resonance mode frequency may delay the transfer of data because the data cannot be confidently transferred until the amplitude of the movement of the head slider has substantially decayed.

Of particular importance are the first and second torsion resonance modes and lateral bending (or sway) resonance mode of vibration. These resonance modes can result in lateral movement of the head slider at the end of the head suspensions and are dependent on cross-sectional properties along the length of the load beam. The torsion modes sometimes produce a mode shape in which the tip of the resonating head suspension moves in a circular fashion. However, since the head slider is maintained in a direction perpendicular to the plane of the disk surface by the spring force of the load beam acting against the air bearing, lateral motion of the rotation is seen at the head slider. The sway mode is primarily lateral motion. The first torsion resonance mode is of particular importance because it usually occurs at frequencies which are low enough to be commonly encountered in rigid disk drive head suspensions (typically below 5000 Hz).

Approaches to minimize the effect of resonance modes include designing the head suspension so that certain resonance modes are high enough so as not to be excited within a particular disk drive or to minimize the movement of the head slider or gain that results from one or more resonance modes(s). The latter can be accomplished by designing the head suspension so that gain is minimal or by damping the movement.

The use of dampers on head suspensions to decrease gain at resonance mode frequencies is generally known and described, for example, in U.S. Pat. Ser. No. 5,187,625 issued to Blaeser et al. on Feb. 16, 1993 ("Blaeser") and U.S. Pat. Ser. No. 5,299,081 issued to Hatch et al. on Mar. 29, 1994 ("Hatch").

Both Blaeser and Hatch disclose the use of elastic and visco-elastic damping materials located on a part of the head suspension to absorb vibrations. However, use of such materials often necessitates the addition of curing or outgassing steps to the fabrication process. Further, the use of such materials requires care to prevent the attraction of contaminants both during the fabrication process and during in situ use. Also, such damping materials typically require the addition of a constraint layer of stainless steel or other rigid material over an exposed surface of the damper. As such, use of these types of dampers can add significant mass to the head suspension. Added mass (depending upon where it is localized) can increase the time required for vibrations of the head suspension to decay and, thus, increase information access times. Further, adding viscous material to a head suspension can add steps to the manufacturing process, slowing the process and increasing costs.

SUMMARY OF THE INVENTION

The present invention is directed to a head suspension having a vibration absorbing structure which is efficient to manufacture, and which adds little or no mass to the head suspension. In particular, the head suspension includes a load beam having a mounting region, a rigid region, and a spring region. A flexure (either integral with the load beam, or provided as a separate component) is located at a distal end of the load beam and includes a head slider bond pad for supporting a head slider. A vibration absorbing member extends from the head suspension. The vibration absorbing member is tuned to have a resonance mode frequency equal to a resonance mode frequency of the head suspension and is especially designed to vibrating during resonance vibrations of the head suspension. As such, energy of a resonance mode vibration of the head suspension is absorbed by the vibration of the vibration absorbing member, thereby reducing the gain of the head slider.

The vibration absorbing member can, for example, be attached to or formed as part of the rigid region of the load beam and extend therefrom. If the vibration absorbing member is formed as part of the load beam, it can advantageously be added without adding mass to the head suspension. In other embodiments, the vibration absorbing member can be formed as an extension of other components of the head suspension. For example, it can be made as part of the flexure and extend therefrom.

DETAILED DESCRIPTION

Figure 1:
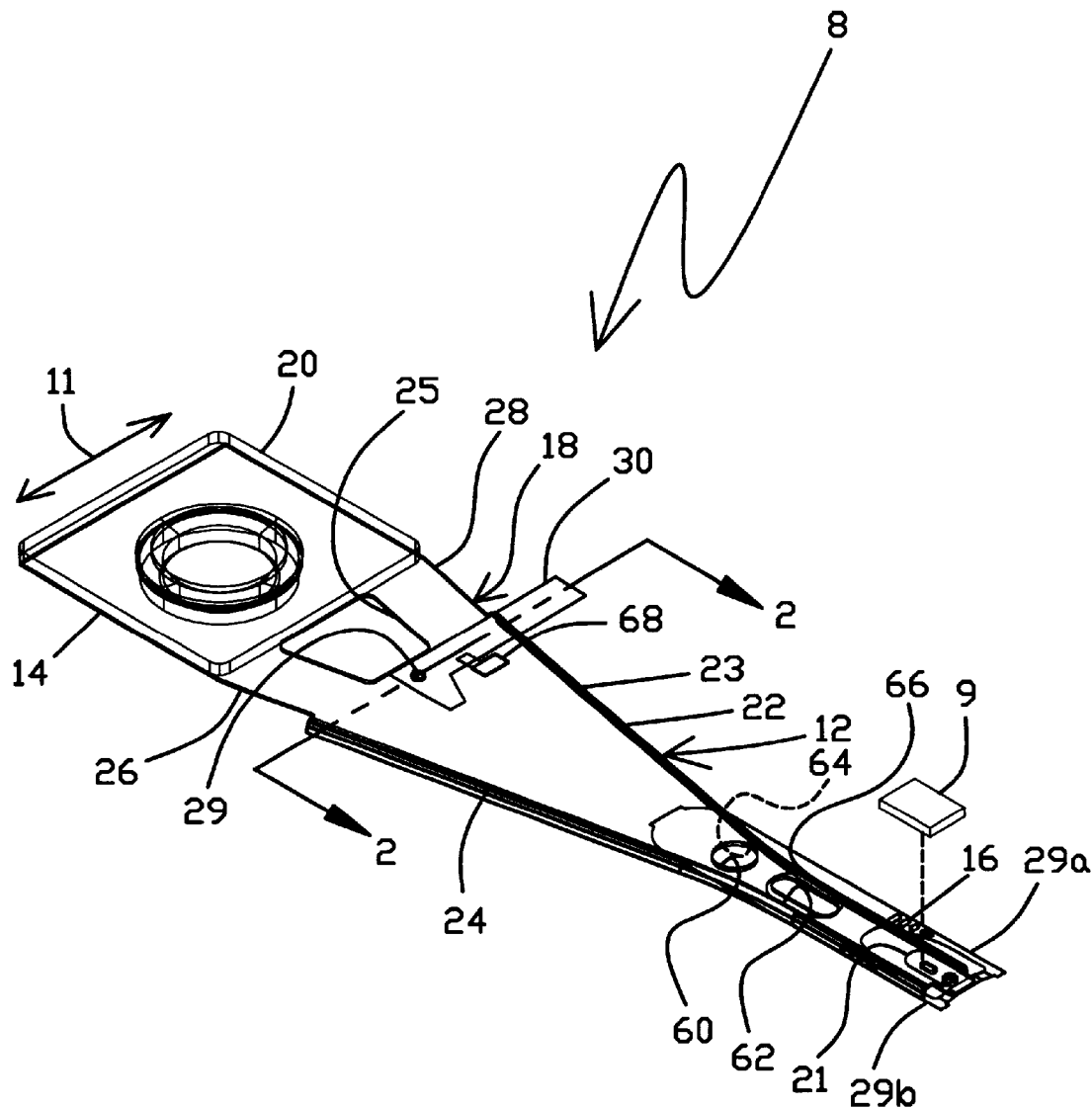
FIG. 1 is a bottom isometric view of a head suspension having a vibration absorbing member in accordance with the present invention.
Figure 2:
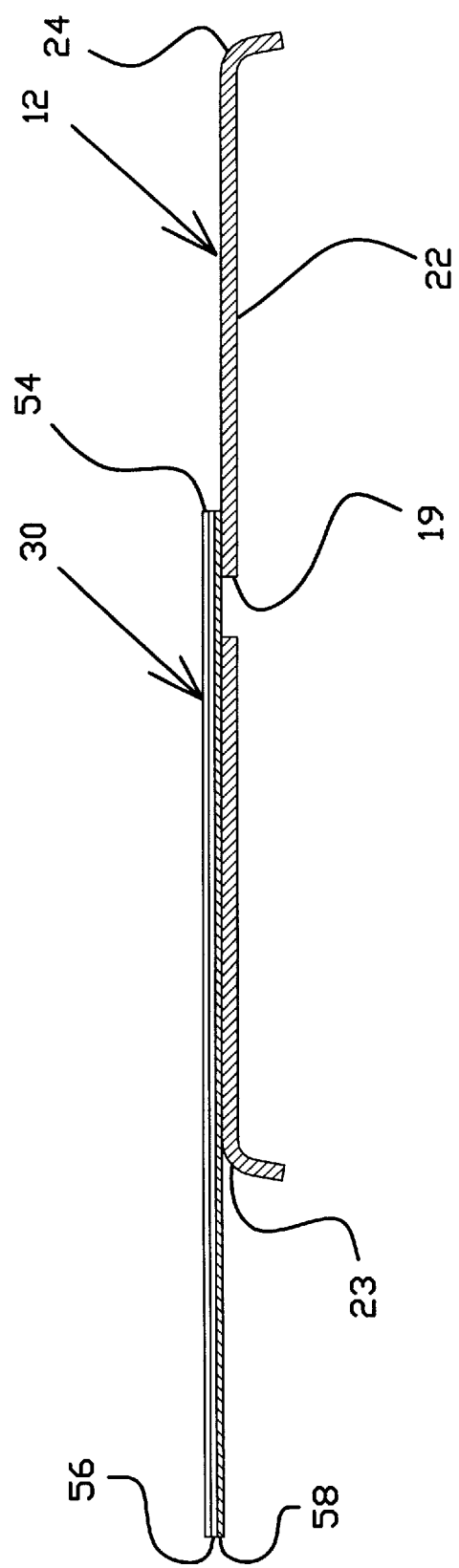
FIG. 2 is a sectional view of the head suspension shown in FIG. 1 taken along line 2—2 of FIG. 1.

FIG. 1 is a bottom, isometric view of a head suspension 8 including a load beam 12 and a rigid vibration absorbing member 30 in accordance with the present invention. Load beam 12 includes a base or mounting region 14 on a proximal end, a relatively rigid region 22 adjacent a distal end, and a radius or spring region 18 between the mounting region 14 and rigid region 22. A flexure 16 is mounted at the distal end of load beam 12 for providing a spring connection between the load beam and head slider 9. Though flexure 16 is shown as a separate component from load beam 12, it is also contemplated to form flexure 16 integrally with load beam 12 as a single component therewith. A base plate 20 is mounted to mounting region 14 for attaching the suspension 8 to a disk drive actuator arm (not shown). The rigid region 22 has first and second lateral edges 23 and 24, respectively, at transversely spaced, opposite sides. Preferably, spring region 18 has an aperture 25 located in the center thereof to reduce the spring force of load beam 12. Aperture 25 forms a first radius arm 26 on one side thereof and second radius arm 28 on the opposite side thereof Alignment apertures 64 and 66 are preferably provided for alignment of flexure 16 with load beam 12 when mounting flexure 16 to load beam 12. As shown in FIG. 2, which is a sectional view of head suspension 8 taken along line 2—2 of FIG. 1, load beam 12 preferably includes a tooling aperture 19 in the rigid region 22 just distal of aperture 25 for reasons set out below. Load beam 12 can be fabricated and formed from a sheet of stainless steel or other resilient material in a conventional manner.

The spring region 18 of the load beam 12 includes a preformed bend or radius. This radius provides the spring or load force and thus a desired load to a head slider 9 for a predetermined offset height, the offset height being a measurement of the distance between the mounting height of the head suspension to the actuator arm and the head slider 9 at fly height above the disk.

A spring connection is provided between the head slider 9 and the distal end of the load beam 12 by a flexure 16 located at the distal end of the load beam and which permits head slider 9 to move in pitch and roll directions so that it can compensate for fluctuations of a spinning disk surface above which the head slider 9 flies. Flexure 16 preferably includes tongue 21 supported between spring arms 29a and 29b to allow for pitch and roll motion of the head slider 9. Flexure 16 also preferably includes alignment apertures 60 and 62 for alignment with apertures 64 and 66, respectively, of load beam 12 when mounting flexure 16 to load beam 12.

Many different types of flexures, also known as gimbals, are known to provide the spring connection allowing for pitch and roll movement of head slider 9 and are contemplated to be used with the present invention. It is also contemplated to form the flexure integrally with the load beam, as known, rather than as a separate component such as flexure 16.

In the embodiment of FIG. 1, rigid region 22 has a top face and a bottom face and substantially resilient vibration absorbing member 30 extends in a transverse direction 11 from the bottom face of the rigid region 22 of load beam 12 and acts to reduce the gain as measured at head slider 9 of resonance mode vibrations of head suspension 8. Vibration absorbing member 30 can be used in conjunction with elastic or visco-elastic dampers either with or without constraint layers.

As illustrated, vibration absorbing member 30 is a rectangular strip extending from the rigid region 22 past lateral edge 23 of load beam 12. Vibration absorbing member 30 can be welded, adhered, or otherwise attached at mounting point 29 in the transverse center of the rigid region 22 just distal of aperture 25. However, other locations for attachment of member 30 to head suspension 8 are also within the ambit of the present invention. The portion of vibration absorbing member 30 extending beyond attachment point 29 remains unattached to load beam 12. In this way vibration absorbing member 30 acts as a cantilever type beam structure, similar to load beam 12. It is also contemplated that vibration absorbing member extend in two or more directions from the attachment point 29. By doing so, the vibration absorbing member could, in addition to extending over edge 23, also extend over edge 24 and/or into aperture 25 and/or longitudinally along the rigid region 22 towards flexure 16. In addition to these directions, the vibration absorbing member could also have a portion which extends diagonally from attachment point 29.

Because vibration absorbing member 30 acts as a cantilever type beam structure, it is contemplated, though not necessary, to include shock limiter 68 on load beam 12. Shock limiter 68 protrudes from rigid region 22 of load beam 12 and extends over vibration absorbing member 30 without touching vibration absorbing member 30 when vibration absorbing member is in its neutral or undeformed state. Because shock limiter 68 is rigidly attached to load beam 12, the travel of vibration absorbing member 30 in a direction transverse to the plane of load beam 12 is "limited" to remain between load beam 12 and shock limiter 68. Thus, shock limiter 68 acts to reduce the possibility that vibration absorbing member 30 will permanently or plastically deform in a direction perpendicular to load beam 12 as a result of a physical shock thereto. Details of the function and fabrication of limiters such as shock limiter 68 are fully disclosed in co-pending U.S. patent application Ser. No. 08/653,937, filed May 23, 1996, now U.S. Pat. No. 5,771,136, for "Suspension Assembly For Mounting A Head Slider Having A Flexure With A Shock Limiter" owned by the assignee of the present application, and hereby incorporated by reference in its entirety.

Figure 3:
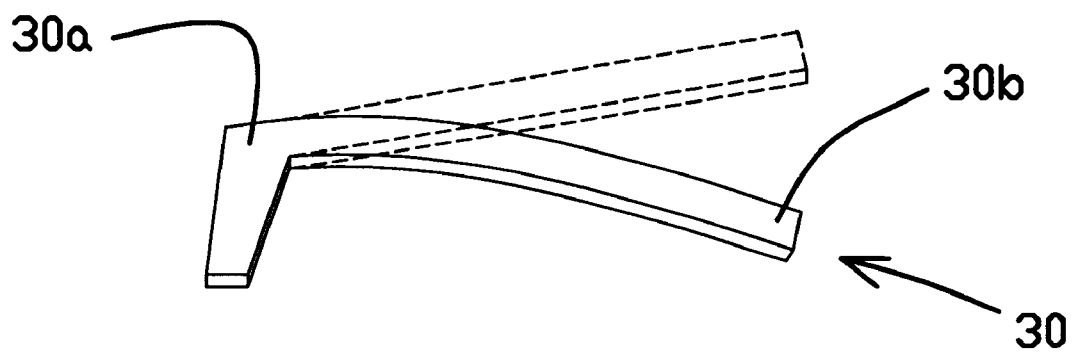
FIG. 3 is a isometric view of the vibration absorbing member shown in FIG. 1 showing the first bending resonance mode thereof.

Vibration absorbing member 30 has, among other modes, a first longitudinal bending resonance mode, the shape of which is shown in FIG. 3 exaggerated for purposes of illustration. As shown in FIG. 3, the node, or point of least displacement during a resonance vibration, of the first longitudinal bending mode occurs at the end 30a of vibration absorbing member 30 which is to be attached to load beam 12. An anti-node (that is, location of greatest displacement during a resonance vibration) occurs, as shown in FIG. 3 in phantom, at the opposite end, or free end, 30b of vibration absorbing member 30. As discussed below, it is preferred, to have a resonance mode frequency or frequencies of vibration absorbing member 30 occur at substantially the same frequency as a resonance mode frequency or frequencies of head suspension 8. The frequencies of the resonance modes of vibration absorbing member 30 varies with the length of vibration absorbing member 30. Accordingly, the length of vibration absorbing member 30 can be trimmed or "tuned" to have a bending resonance mode frequency to match that of a resonance mode frequency of head suspension 8.

Of particular importance is the first torsional resonance mode of load beam 12 because the frequency thereof is typically within a range of frequencies that are commonly present during operation of a disk drive storage system. As such, though vibration absorbing member 30 can be tuned to vibrate at other resonant mode frequencies of head suspension 8, the length of vibration absorbing member 30 is preferably tuned to have a bending resonance mode frequency substantially the same as that of the first torsion resonance mode frequency of load beam 12. Vibration absorbing member 30 is preferably tuned by either forming member 30 to be of a predetermined length based on calculated (modeled) or empirical data or starting with a longer length and subsequently trimming member 30 to the predetermined length before or after mounting member 30 to load beam 12.

The operation of vibration absorbing member 30 is based on the physical principal that to sustain a vibratory motion at a resonance frequency, a mechanical system will absorb significantly more energy than the system will absorb to sustain a vibratory motion at a non-resonance frequency. Further, the amplitude of a vibration of a mechanical system at a resonance mode frequency is dependent upon the amount of energy input into the system, the less energy input into the system, the smaller the amplitude of the vibration.

Vibration absorbing member 30 is physically coupled to head suspension 8. Therefore, of a given amount of energy input into head suspension 8 which gives rise to vibrations at a resonance frequency of head suspension 8, some of that energy will be absorbed by vibration absorbing member 30. If vibration absorbing member 30 is tuned to have a resonance mode frequency substantially the same as a resonance mode frequency of head suspension 8, then vibration absorbing member 30 will absorb more energy at this frequency, thereby leaving less energy available for use by head suspension 30 at its resonance mode frequency. This results in lower amplitude, and therefore lower gain, vibrations of head suspension 30 at its resonance mode frequency to which vibration absorbing member 30 is tuned.

Accordingly, by mounting vibration absorbing member 30 to head suspension 8, the dynamic characteristics of head suspension 8 are altered. Essentially, the mechanical system comprising the components of head suspension 8 is altered when vibration absorbing member 30 is attached to head suspension 8 and a different mechanical system having different dynamic characteristics results. This can be seen with reference to FIGS. 4 and 5.

Figure 5:
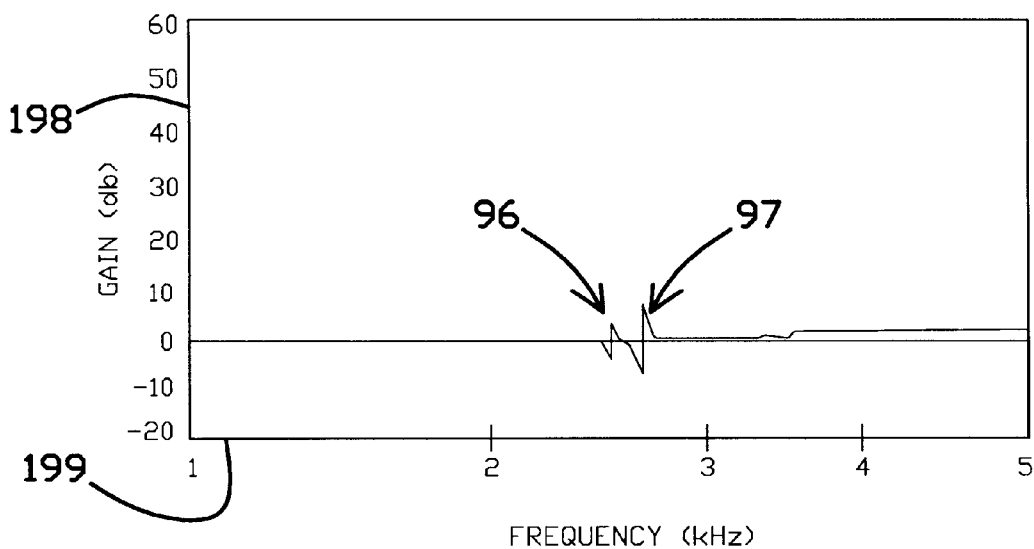
FIG. 5 is a graph of gain versus frequency for a head suspension of the type shown in FIG. 1 including a vibration absorbing member of the type shown in FIG. 1 and illustrating two, reduced gain resonance peaks.
Figure 4:
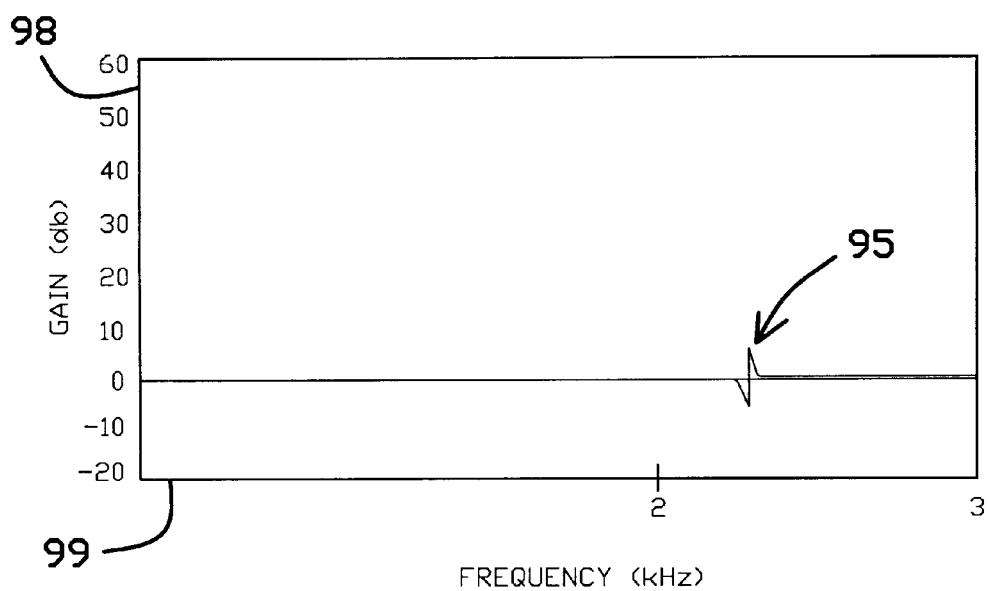
FIG. 4 is a graph of gain versus frequency for a standard head suspension of the type shown in FIG. 1 without a vibration absorbing member, and showing a single, relatively large gain first torsion resonance peak.
Figure 14:
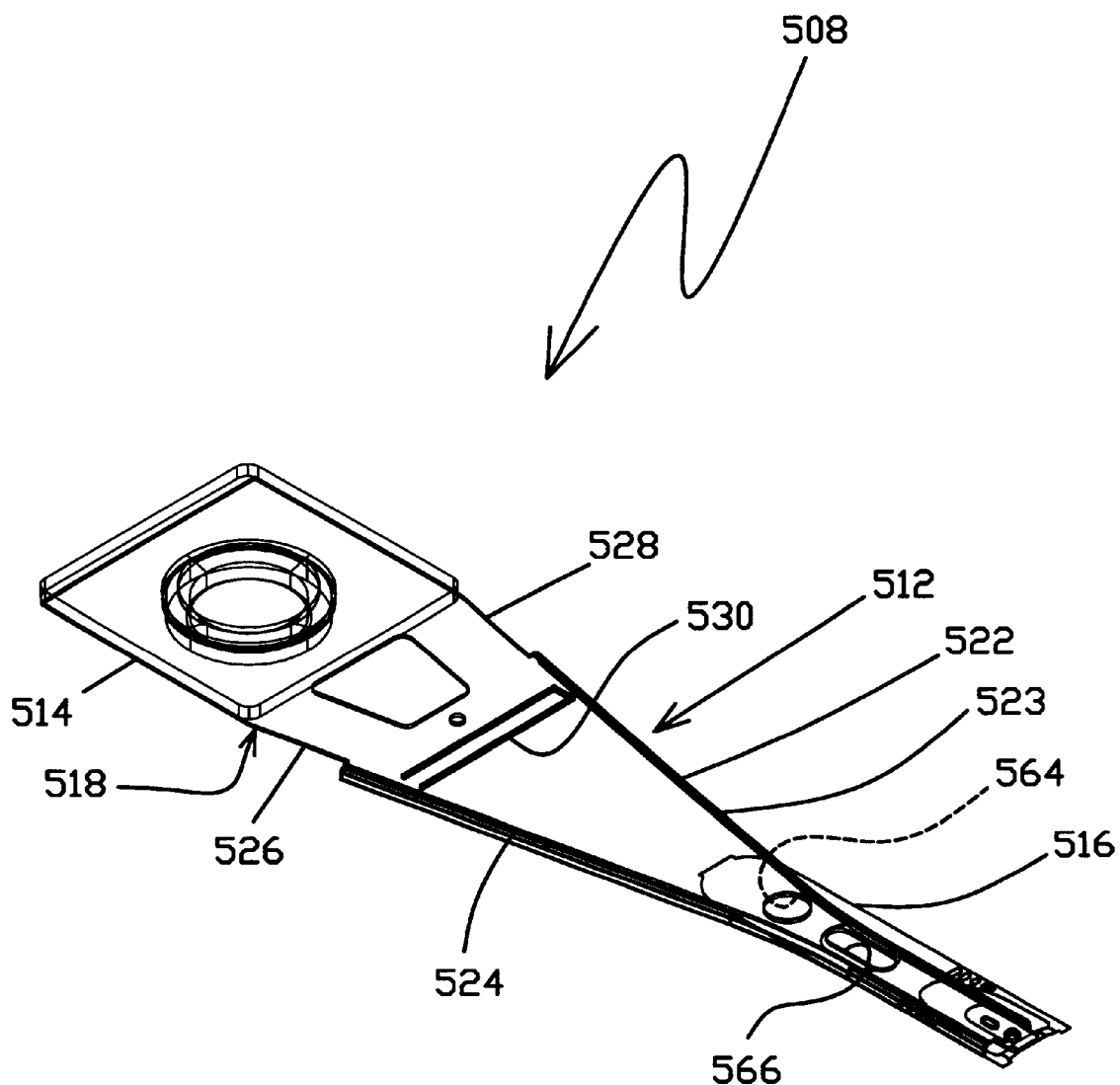
FIG. 14 is an isometric view of a sixth embodiment of a head suspension including a vibration absorbing member formed integrally with the load beam in accordance with the present invention.

FIGS. 4 and 5 show results of tests run on two model T830 head suspensions, which are commercially available from Hutchinson Technology Incorporated of Hutchinson, Minn. One model T830 head suspension was unaltered and the second was altered to include a vibration absorbing member 530 like the one shown in FIG. 14. As shown in FIG. 14, and as will be discussed below, rather than being a separate member such as vibration absorbing member 30, vibration absorbing member 530 is formed from a portion of the rigid region of the load beam. However, vibration absorbing member 530 operates in substantially the same way as vibration absorbing member 30 to reduce the gain of resonance mode vibrations of a head suspension 508. FIG. 4 shows gain, in dB on axis 98, at the head slider of the unaltered T830 head suspension versus frequency, in Hz on axis 99, that is input at the base of the head suspension. As shown, the unaltered T830 head suspension has peak 95 in gain of about 7.72 dB at about 2450 Hz. Peak 95 is evidence of the first torsion mode resonance frequency.

FIG. 5 shows a graph of gain, on axis 198, versus frequency, on axis 199, of a T830 head suspension altered to include vibration absorbing member 530. Vibration member 530 was tuned to have a bending mode resonance frequency substantially the same as that of the first torsion mode resonance frequency of load beam 512. As shown, rather than the single resonance peak 95 of the T830 load beam without a vibration absorbing member, two resonance peaks 96 and 97 occurring at about 2400 Hz and 2480 Hz, respectively, result.

Peaks 96 and 97 each have lower gain than peak 95; peak 96 has a gain of about 2.81 dB and peak 97 has a gain of about 4.67 dB. Accordingly, the formation of vibration absorbing member 530 in load beam 512 acts to reduce gain of vibrations at resonance mode frequencies of the vibration absorbing member/head suspension system.

It is thought that the resonance mode of peak 96 is one in which load beam 508 and vibration absorbing member 530 are moving in phase. That is, vibration absorbing member 530 is moving with the remainder of the surface of load beam 512. Also, it is thought that the resonance mode of peak 97 is one in which load beam 508 and vibration absorbing member 530 are moving approximately 180 degrees out of phase. That is, the anti-node (or anti-nodes) of the resonance vibration of the vibration absorbing member 530 is (or are) moving in a direction opposite to that of the remainder of the surface of load beam 512 at any given time during a single resonance mode cycle.

Figure 6:
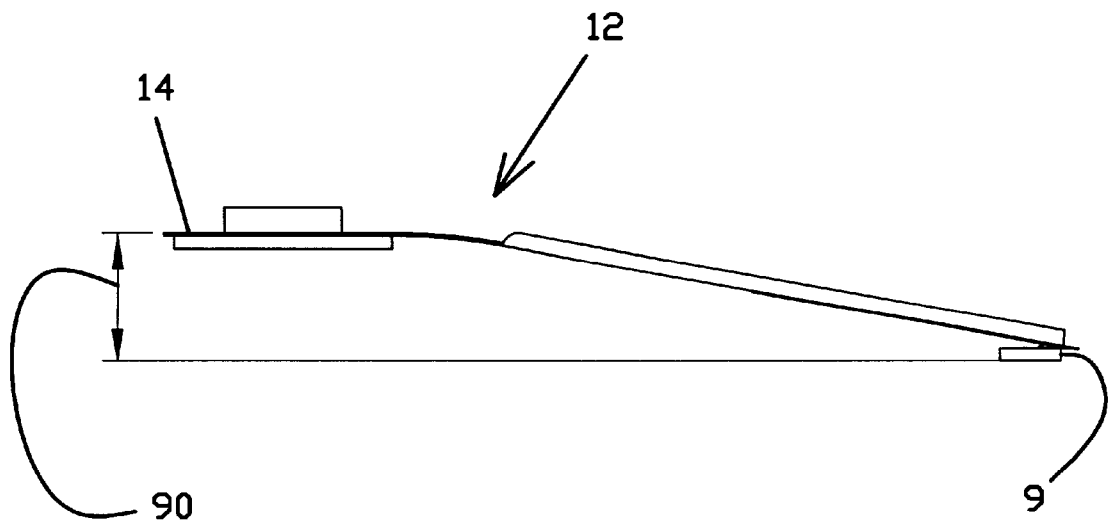
FIG. 6 is a side view of the head suspension shown in FIG. 1 showing Z-height.
Figure 7:
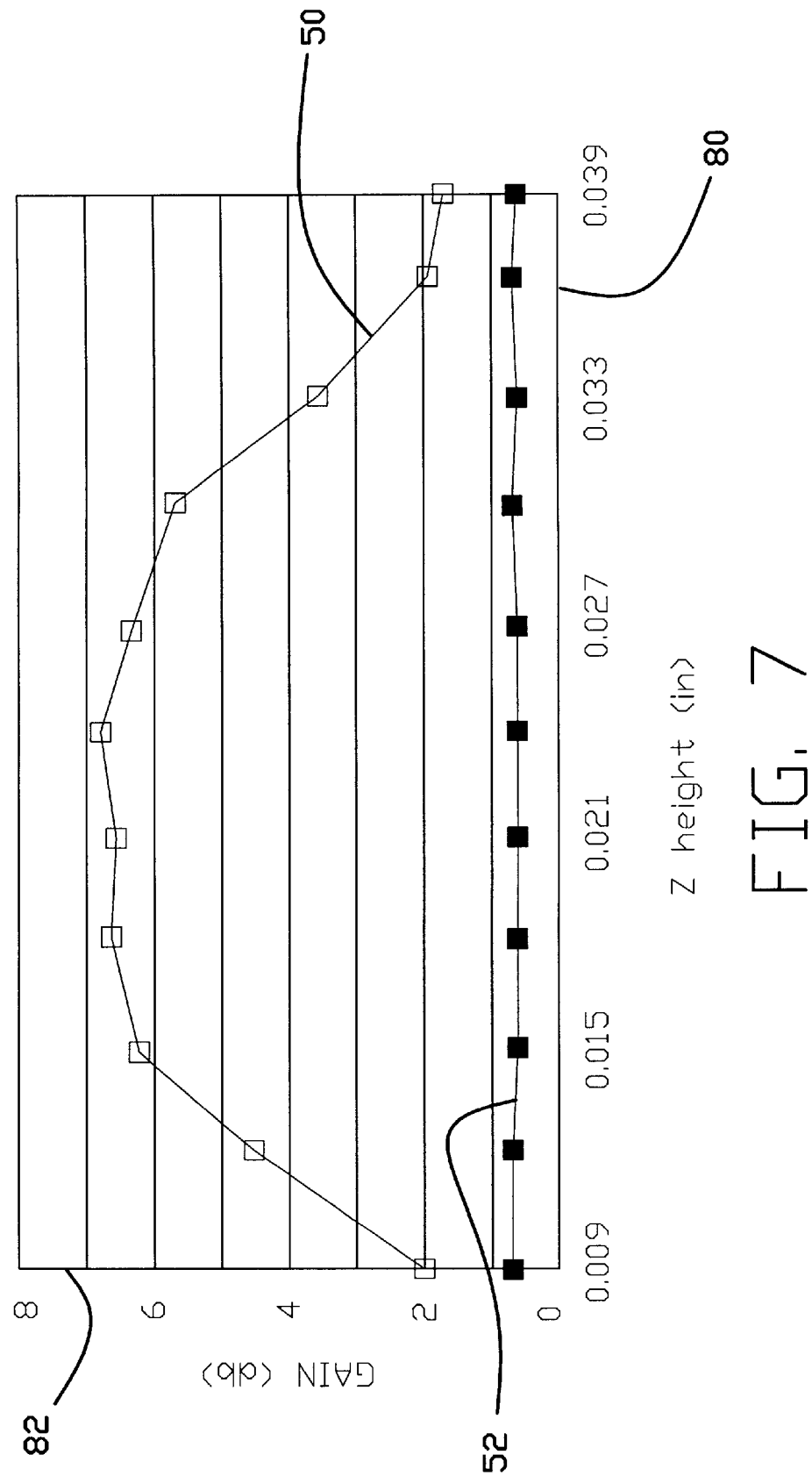
FIG. 7 is a graph of Z-height versus first torsion resonance mode gain for a head suspension of the type shown in FIG. 1 one without and one with a vibration absorbing member as shown in FIG. 1 tuned to the first torsion resonance mode frequency.

The concept of Z-height is also important in reduction of gain in vibrations at resonance mode frequencies in head suspensions. As shown in FIG. 6, Z-height 90 is the vertical distance between the mounting region 14 of load beam 12 and a lower face of head slider 9 at fly height. It is advantageous for to be able to reduce gain of vibrations at resonance mode frequencies in head suspension over a range of Z-heights because the Z-height for a given load beam is dependent upon the environment in which the load beam is to be used. Tests were conducted on a second pair of Hutchinson Technology model T830 head suspensions, one without a vibration absorbing member 30 and one with a vibration absorbing member 30 tuned to the first torsion resonance mode frequency of the T830 load beam. FIG. 7 shows a graph of Z-height in inches, along axis 70, versus first torsion resonance mode gain in decibels, along axis 72 for both T830 load beams. The first torsion gain is the gain in amplitude at the flexure of a head suspension caused by a vibration applied at the base of a load beam at the first torsion resonance frequency. Data line 50 shows first torsion gain for a T830 load beam without vibration absorbing member 30 as Z-heights are varied. Data line 52 shows first torsion gain for a T830 load beam with vibration absorbing member 30 as Z-heights are varied. As shown, the first torsion gain of the head suspension including the vibration absorption member is advantageously reduced from that of the head suspension without the vibration absorption member for a range of Z-heights.

It is understood that it is also within the scope of the present invention to use a vibration absorbing member having a shape other than a rectangular strip, for example, a square, triangle, circular disk, or "star" shape in which a number of strips meet at a center hub attachment point. Other types of structures could also be used as a vibration absorbing member as long as the structure was physically coupled to head suspension 8 and could vibrate at a resonance mode frequency or frequencies of head suspension 8 to absorb energy introduced into the head suspension/ vibration absorbing member system. For example, a structure could be attached to the head suspension at more than one attachment point. Such a structure could suspend a vibration absorbing structure from a plurality of attachment points. Also, it is contemplated that the vibration absorbing structure could extend out of the planes of the load beam and/or flexure. For example, a resonance absorbing structure could have a portion which extends at some angle other that 0 degrees to the plane of the head suspension. The rectangular strip shape, however, is preferred because it has a distinct and relatively simple longitudinal bending resonance mode, the frequency of which can be easily varied by merely changing the length of the strip.

The appropriate length of member 30 can be ascertained empirically by determining at what length vibration absorbing member 30 most effectively damps the desired resonance mode (such as the first torsion mode) of head suspension 8. Methods of measuring gain at specific resonance frequencies are well known in the art.

Figure 8:
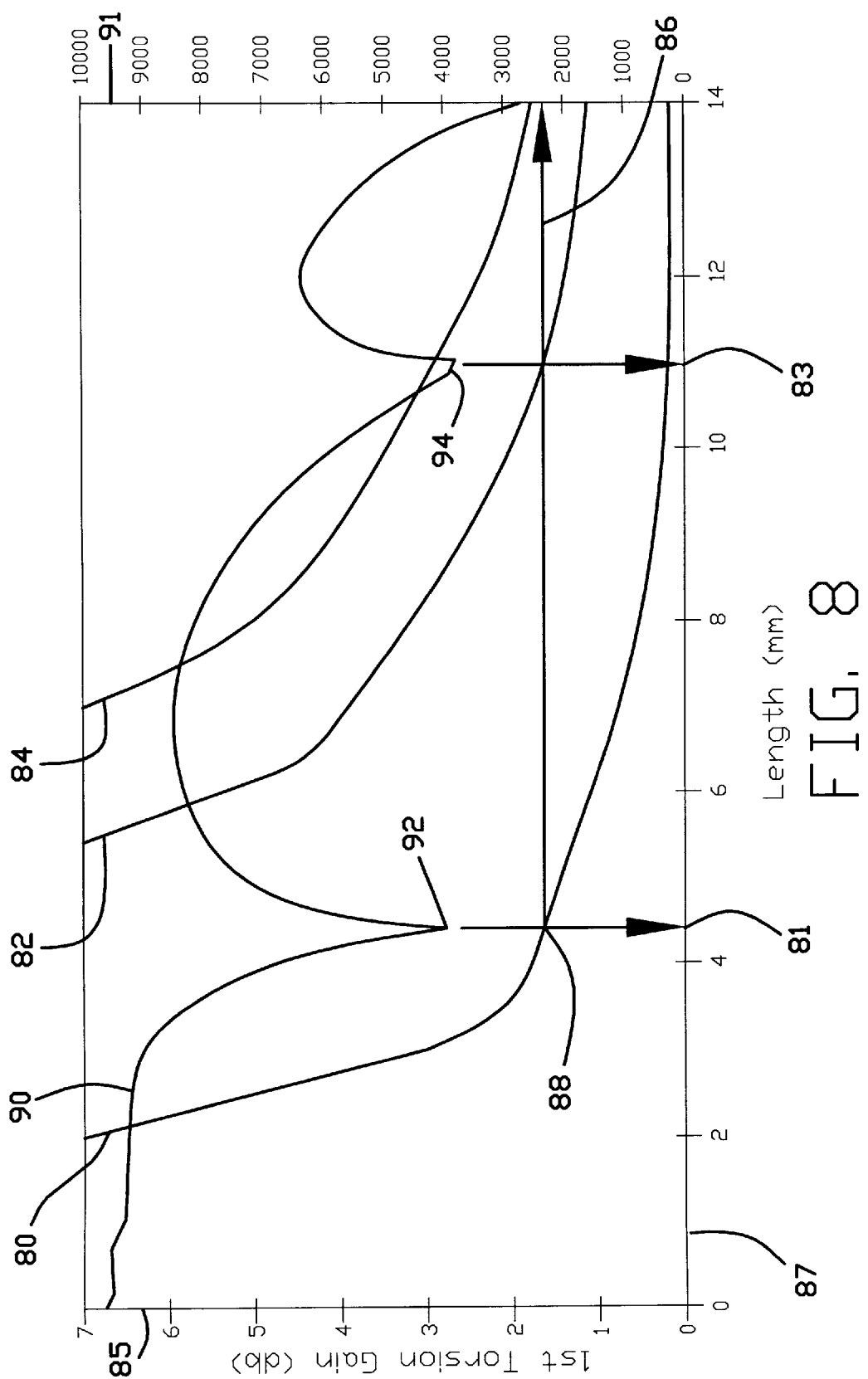
FIG. 8 is a graph of frequency versus vibration absorbing member length showing the length dependency of frequencies at which first, second and third resonance modes of the vibration absorbing member shown in FIG. 1 occur.

The appropriate length of member 30 can also be ascertained by using computer modeling to determine the resonance mode frequencies of vibration absorbing member 30 and plotting these frequencies versus the length of vibration absorbing member 30, as shown in FIG. 8. The critical length in making this plot is the length of member 30 from mounting point 29 to load beam 12 to one end of member 30. FIG. 8 is a graph of frequency, in kHz on axis 91, versus length of vibration absorbing member 30 in millimeters on axis 87. Data line 80 shows the predicted frequency dependence of a first resonance mode of vibration absorbing member 30 (the shape of which is shown in FIG. 3) on the length thereof, data line 82 shows the predicted frequency dependence of a second resonance mode of vibration absorbing member 30 on the length thereof, and data line 84 shows the predicted frequency dependence of a third resonance mode of vibration absorbing member 30 on the length thereof.

The frequency of resonance mode of the head suspension, such as head suspension 8, the gain of which it is desirable to reduce, is then plotted with a horizontal line crossing the vertical frequency axis as shown by data line 86. In FIG. 8, for example, a first torsional resonance frequency for a head suspension is plotted to be about 2400 Hz. The length 81 of vibration absorbing member 30 corresponding to the point of intersection 88 of data lines 86 and 80 gives the length 81 of vibration absorbing member 30 that has a first bending mode resonance frequency substantially matching that of the first mode resonance frequency of head suspension 8. Thus, if vibration absorbing member 30 is trimmed to length 81, it will effectively reduce the gain of the first torsion mode resonance frequency of head suspension 8. This is shown by data line 90, which is a computer modeled plot of the expected first torsion resonance mode gain, plotted on axis 85 in dB, of head suspension 8 versus the length of vibration absorbing member 30, superimposed on axes 85 and 87. As data point 92 shows, the gain of head suspension 8 vibrating at its first torsion mode resonance frequency will be advantageously reduced when vibration absorbing member 30 is trimmed to length 81.

Likewise, if vibration absorbing member 30 is trimmed to length 83 corresponding to the intersection of data lines 82 and 86, then the second bending resonance mode frequency of vibration absorbing member 30 will be substantially equal to the first torsion resonance mode frequency of load beam 8. If vibration absorbing member 30 is so trimmed, it will effectively reduce the gain of the first torsion mode resonance frequency of head suspension 8. This is shown by data point 94 of data line 90, which illustrates that the gain of head suspension 8 vibrating at its first torsion mode resonance frequency will be advantageously reduced when member 30 is trimmed to length 83.

Vibration absorbing member 30 can be formed from any resilient material such as stainless steel or stainless steel coated with other materials. As shown in FIG. 2, which is a sectional view of load beam 12 including vibration absorbing member 30, vibration absorbing member 30 is preferably formed having three laminated layers. An upper layer of copper 54 overlays a middle layer of dielectric 56 such as polyimide, which overlays a base layer of stainless steel 58. It was found that by laminating member 30 in this manner, the length of member 30 was less critical to effective reduction of gain than the length of a similar member formed using only a single layer of stainless steel. That is, by laminating member 30, the length thereof does not have to be tuned as precisely as the length of a vibration absorbing member formed from a single layer of stainless steel, to achieve effective reduction of gain of a resonance mode frequency of head suspension 8. However, it is to be understood that the resonance mode frequency to which a laminated vibration absorbing member can be tuned to effectively reduce the gain of vibrations of a head suspension at a resonance mode frequency thereof is substantially the same as that resonance mode frequency of the head suspension.

It is also contemplated to form vibration absorbing member 30 to have a layer of elastic or visco-elastic material either between layers of relatively rigid material or overlaying a layer of relatively rigid material. However, by forming vibration absorbing member 30 from stainless steel alone or a laminated sheet of stainless steel, polyimide, and copper, any need to cure or out-gas the damper is eliminated. This has the advantage of reducing manufacturing steps. Further, vibration absorbing member 30 adds relatively little weight to head suspension 8. Accordingly, disk access time can be reduced.

It was found that as the location and orientation of vibration absorbing member 30 was varied on head suspension 8, the ability of vibration absorbing member 30 to effectively reduce the gain of vibrations of head suspension 8 at a resonance mode frequency thereof varied only slightly, and not significantly with respect to the gain achieved over head suspension 8 without vibration absorbing member 30. Accordingly, as the designs of the various embodiments shown in FIGS. 10 through 16 and described below makes clear, the exact location and orientation of the vibration absorbing member on the head suspension is not critical to effective gain reduction. Specifically, the vibration absorbing member does not have to be coupled to the load beam in any particular location nor does it have to extend in any particular direction to be effective. It may extend transversely, longitudinally, or diagonally. Further, the vibration absorbing member may be located either on the top face or the bottom face of the load beam, or it can be formed integrally with the load beam and be co-planar therewith. Also, it can be formed integrally with the flexure, and may or may not extend over any edge of the load beam. It is only necessary that the vibration absorbing member attach at at least a single point to the head suspension and have a component which can freely vibrate.

To fabricate load beam 12, blanks having the dimensions of load beam 12 are cut or otherwise formed from a sheet of stainless steel. The blanks are then formed to provide a spring region 18, including aperture 25, rigid region 22, mounting region 14, and alignment apertures 19, 64 and 66. To fabricate flexure 16, blanks having the dimensions thereof are cut or otherwise formed from a sheet of stainless steel. The blanks are formed to provide tongue 21, arms 29a and 29b, and alignment apertures 60 and 62. Flexure 16 can be mounted to load beam 12 by welding, adhesive or other known methods and using apertures 60, 62, 64 and 66 for tooling and alignment.

Figure 9:
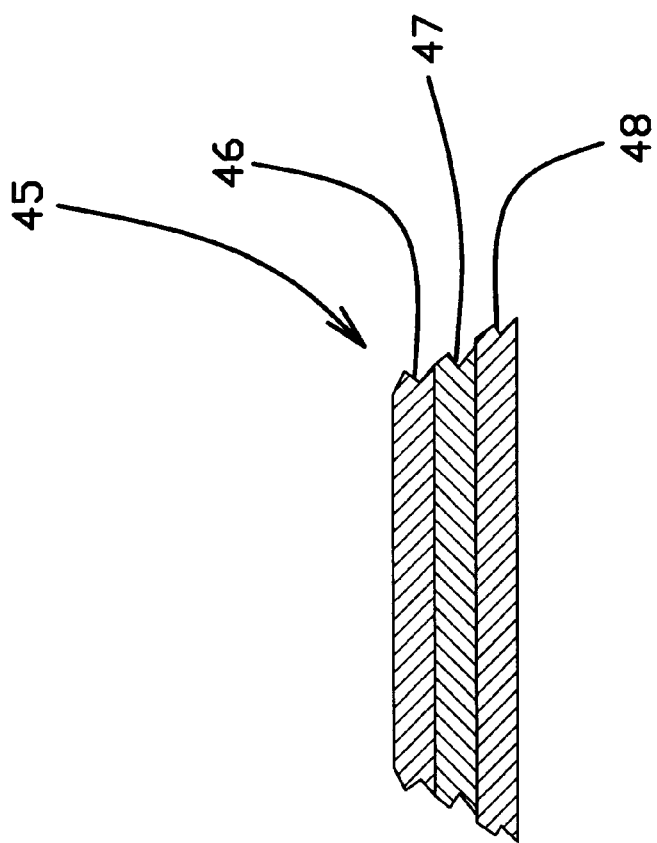
FIG. 9 is a side view of a laminated sheet of material useful in the fabrication of the head suspension shown in FIG. 1.

Vibration absorbing member 30 can be chemically etched or otherwise cut from a laminated sheet of material such as laminated sheet 45 shown in FIG. 9. Laminated sheet 45 preferably comprises a first layer 46 of copper overlaying a second layer 47 of polyimide overlaying a third layer 48 of stainless steel. As noted above, vibration absorbing member 30 can be made from any other substantially rigid material whether laminated or not.

Vibration absorbing member 30 is mounted to load beam 12 at attachment point 29 either by welding, adhesive, or other known means. Tooling aperture 19 can be used to align vibration absorbing member 30 with load beam 12.

Figure 10:
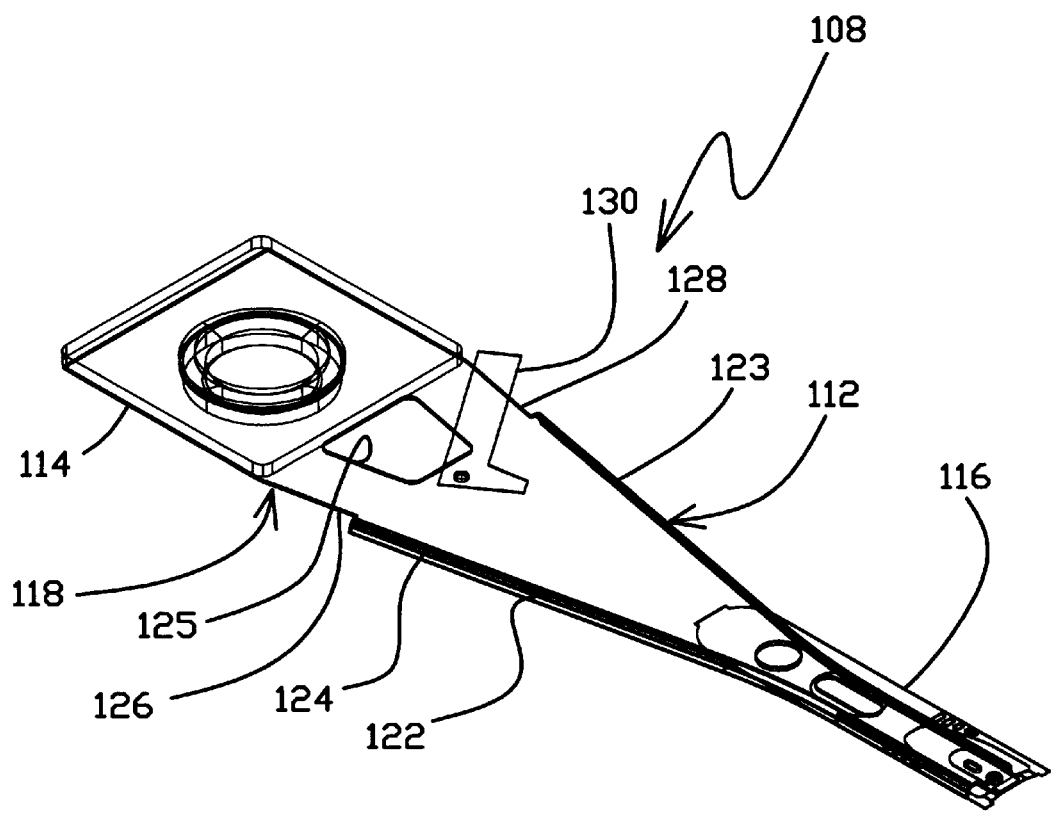
FIG. 10 is a bottom isometric view of a second embodiment of a load beam having a diagonally extending vibration absorbing member in accordance with the present invention.

Another embodiment of a head suspension having a vibration absorbing member in accordance with the present invention is shown in FIG. 10. Elements in FIG. 10 functionally similar to those shown in FIG. 1 are labeled with like numerals incremented by 100. Head suspension 108 includes a load beam 112 having a mounting region 114, a spring region 118 with radius arms 126 and 128, and a rigid region 122 distal to the spring region 118. First and second lateral edges 123 and 124, respectively, are at the side edges of rigid region 122. Aperture 125 is preferably provided in the spring region 118 to reduce the spring rate of load beam 112. Preferably, a vibration absorbing member 130 extends from the rigid region diagonally beneath radius arm 128 and partially across aperture 125. Like vibration absorbing member 30, vibration absorbing member 130 is preferably a narrow, rectangular strip which can be laminated, having a layer of rigid material such as stainless steel, a layer of electrically insulating material, such as polyimide, and a layer of electrically conducting material such as copper.

Vibration absorbing member 130 is preferably tuned to have a longitudinal resonance mode frequency which is substantially the same as a resonance frequency of load beam 112, preferably the first torsion resonance mode frequency. In the same way as vibration absorbing member 30, vibration absorbing member 130 vibrates at a selected resonance mode frequency of load beam 112 to reduce the gain of the selected resonance mode vibration in head suspension 108. Head suspension 108 including vibration absorbing member 130 can be fabricated in substantially the same manner as head suspension 8 and vibration absorbing member 30.

Figure 11:
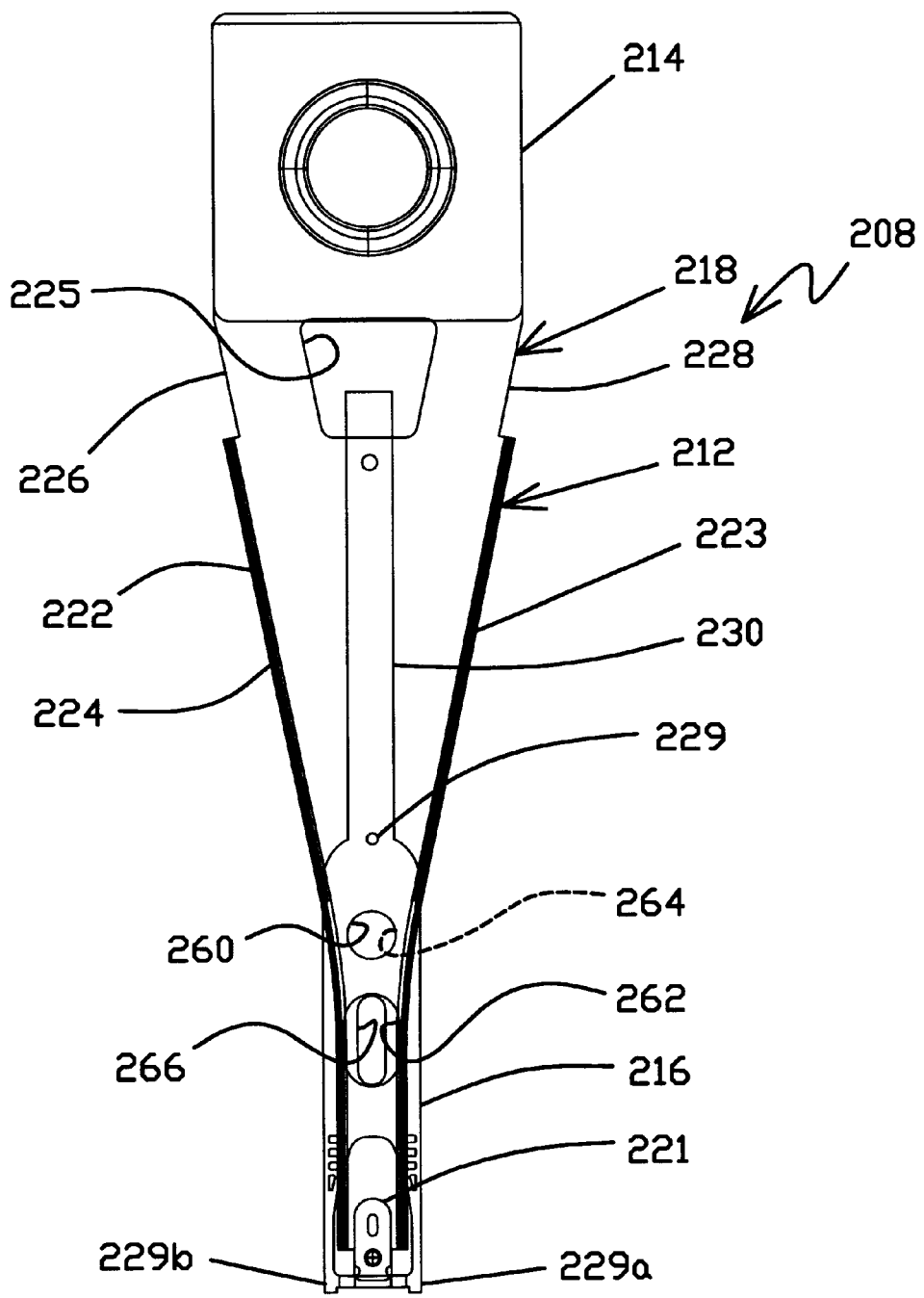
FIG. 11 is a bottom view of a third embodiment of a head suspension having a longitudinally extending vibration absorbing member formed as part of the flexure in accordance with the present invention.

Another embodiment of a head suspension in accordance with the present invention and having a vibration absorbing member extending from the flexure is shown in FIG. 11. Elements in FIG. 11 functionally similar to those shown in FIG. 1 are labeled with like numerals incremented by 200. Head suspension 208 includes a load beam 212 having a mounting region 214, a spring region 218 with radius arms 226 and 228 separated by aperture 225 which is preferably included to reduce the spring force of load beam 212. Load beam 212 also includes a rigid region 222 distal to the spring region 218. First and second lateral edges 223 and 224, respectively, are formed at opposite sides of rigid region 222. Load beam 212 can also include alignment apertures 264 and 266 for accurate alignment of flexure 216 with load beam 212.

Flexure 216 is located at a distal end of load beam 212 and preferably includes tongue 221 supported between spring arms 229a and 229b to allow pitch and roll motion of a head slider (not shown). Flexure 216 can also include alignment apertures 260 and 262 for alignment with apertures 264 and 266, respectively, when mounting flexure 216 to load beam 212.

Vibration absorbing member 230 is formed integrally with flexure 216 and extends from a proximal end thereof Vibration absorbing member 230 can extend longitudinally along load beam 212 and into aperture 225. Vibration absorbing member 230 is attached to load beam 212 at attachment point 229 proximal to flexure 216. Like vibration absorbing member 30, vibration absorbing member 230 is preferably a narrow, rectangular strip and can be laminated, having a layer of rigid material such as stainless steel, a layer of electrically insulating material, such as polyimide, and a layer of electrically conducting material such as copper.

Vibration absorbing member 230 is preferably tuned to have a resonance mode frequency (preferably a bending resonance mode frequency) which is substantially the same as a resonance mode frequency of load beam 212. In the same way as vibration absorbing member 30, vibration absorbing member 230 undergoes a vibration at a resonance mode frequency substantially the same as a selected resonance mode frequency of load beam 212 to reduce the gain of vibrations at the selected resonance mode frequency in head suspension 208.

Load beam 212 can be fabricated in substantially the same manner as load beam 12. Flexure 216 and vibration absorbing member 230 can be fabricated simultaneously by stamping, etching, or otherwise cutting blanks having the dimensions of flexure 216 and vibration absorbing member 230 from a sheet of material or laminated material as shown in FIG. 9 and described above. Alignment apertures 260 and 262, tongue 221, and arms 229a and 229b can then be chemically etched or otherwise formed in flexure 216.

Because vibration absorbing member 230 is formed integrally with flexure 216 alignment apertures 260 and 262 of flexure 216 can be advantageously used with alignment apertures 264 and 266 to accurately align and mount flexure 216 simultaneously with vibration absorbing member 230 to load beam 212. Flexure 216 and vibration absorbing member 230 can be mounted to load beam 212 by adhesive, welding, or other known processes. Aligning and mounting both flexure 216 and vibration absorbing member 230 to load beam 212 simultaneously has the advantage of cutting down on manufacturing steps in fabricating head suspension 208. It has the further advantage of increasing the accuracy of alignment of vibration absorbing member 230. Also, vibration absorbing member 230 extends entirely beneath load beam 212, thus reducing the likelihood that vibration absorbing member 230 would interfere with other components in the disk drive in which it head suspension 208 is placed.

Figure 12:
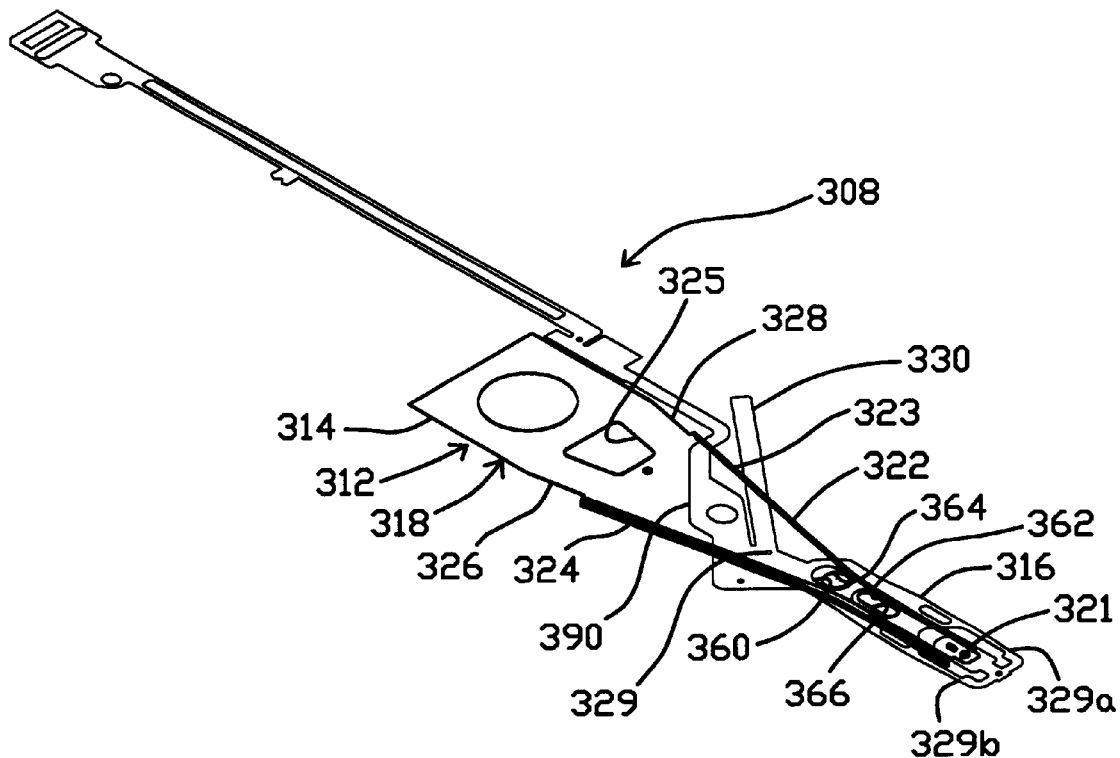
FIG. 12 is an isometric view of a fourth embodiment of a head suspension having an elongated member with a vibration absorbing member extending therefrom in accordance with the present invention.

Another embodiment of a head suspension in accordance with the present invention and having a vibration absorbing member formed integrally with the flexure is shown in FIG. 12. Elements in FIG. 12 functionally similar to those shown in FIG. 1 are labeled with like numerals incremented by 300. Head suspension 308 includes a load beam 312 having a mounting region 314, a spring region 318 with radius arms 326 and 328 separated by aperture 325, and a rigid region 322 distal to the spring region 318. First and second lateral edges 323 and 324, respectively, are at opposite edges of rigid region 322. Load beam 312 can also include alignment apertures 364 and 366 for alignment and mounting of flexure 316 to load beam 312. Flexure 316 can include tongue 321 supported between spring arms 329a and 329b to provide for pitch and roll motion of a head slider (not shown). Flexure 316 can also include alignment apertures 360 and 362 for alignment with apertures 364 and 366, respectively, when mounting flexure 316 to load beam 312.

In the embodiment shown in FIG. 12, extending from a proximal end of flexure 316 is an elongated member 390. Preferably, elongated member 390 extends over the bottom surface (shown on top in FIG. 12) of the rigid region 322 of load beam 312, off load beam 312 past lateral edge 323 just distal of the spring region 318, and longitudinally adjacent to spring region 318 and mounting region 314. Elongated member 390 then preferably extends past the proximal end of load beam 312 to allow attachment of elongated member 390 to an actuator arm (not shown). Preferably, one face of elongated member 390 can then be used to support electrical leads (not shown) for electrically connecting a read/write head (not shown) to data electronics. In the embodiment of FIG. 12, elongated member 390 also includes vibration absorbing member 330 extending diagonally beneath the rigid region 322 of load beam 312. Vibration absorbing member 330 is preferably attached to load beam 312 at attachment point 329 where vibration absorbing member 330 joins with the remainder of elongated member 390. Like vibration absorbing member 30, vibration absorbing member 330 is preferably a narrow, rectangular strip and can be laminated, having a layer of rigid material such as stainless steel, a layer of electrically insulating material, such as polyimide, and a layer of electrically conducting material such as copper.

Vibration absorbing member 330 is preferably tuned to have a longitudinal resonance mode frequency (preferably a bending resonance mode frequency) which is substantially the same as a resonance frequency of load beam 312. In the same way as vibration absorbing member 30, vibration absorbing member 330 undergoes a vibration at a resonance mode frequency substantially the same as a selected resonance mode frequency of load beam 312 to reduce the gain of vibrations at the selected resonance mode frequency in head suspension 308.

Load beam 312 can be fabricated in substantially the same manner as load beam 12. Flexure 316, elongated member 390, and vibration absorbing member 330 can be fabricated in substantially the same manner as flexure 216 with the additional step of forming the electrical leads from the top layer of copper of the laminated sheet by chemically etching the layer of copper such as taught in U.S. Pat. No 5,598,307, issued Jan. 28, 1997 to Bennin for Integrated Gimbal Suspension Assembly, which is hereby incorporated by reference in its entirety. Alignment apertures 360 and 362 of flexure 316 are aligned with alignment apertures 364 and 366 of load beam 312 for mounting flexure 316, and elongated member 390 including vibration absorbing member 330 to load beam 312. Because vibration absorbing member 330 is formed integrally with flexure 316, flexure 316, elongated member 390, and vibration absorbing member 330 can be simultaneously aligned and mounted to load beam 312 by adhesive, welding, or other known processes.

Aligning and mounting both flexure 316 and elongated member 390 including vibration absorbing member 330 to load beam 312 simultaneously has the advantage of cutting down on manufacturing steps in fabricating head suspension 308. It has the further advantage of increasing the accuracy of alignment of vibration absorbing member 330 and elongated member 390.

Figure 13:
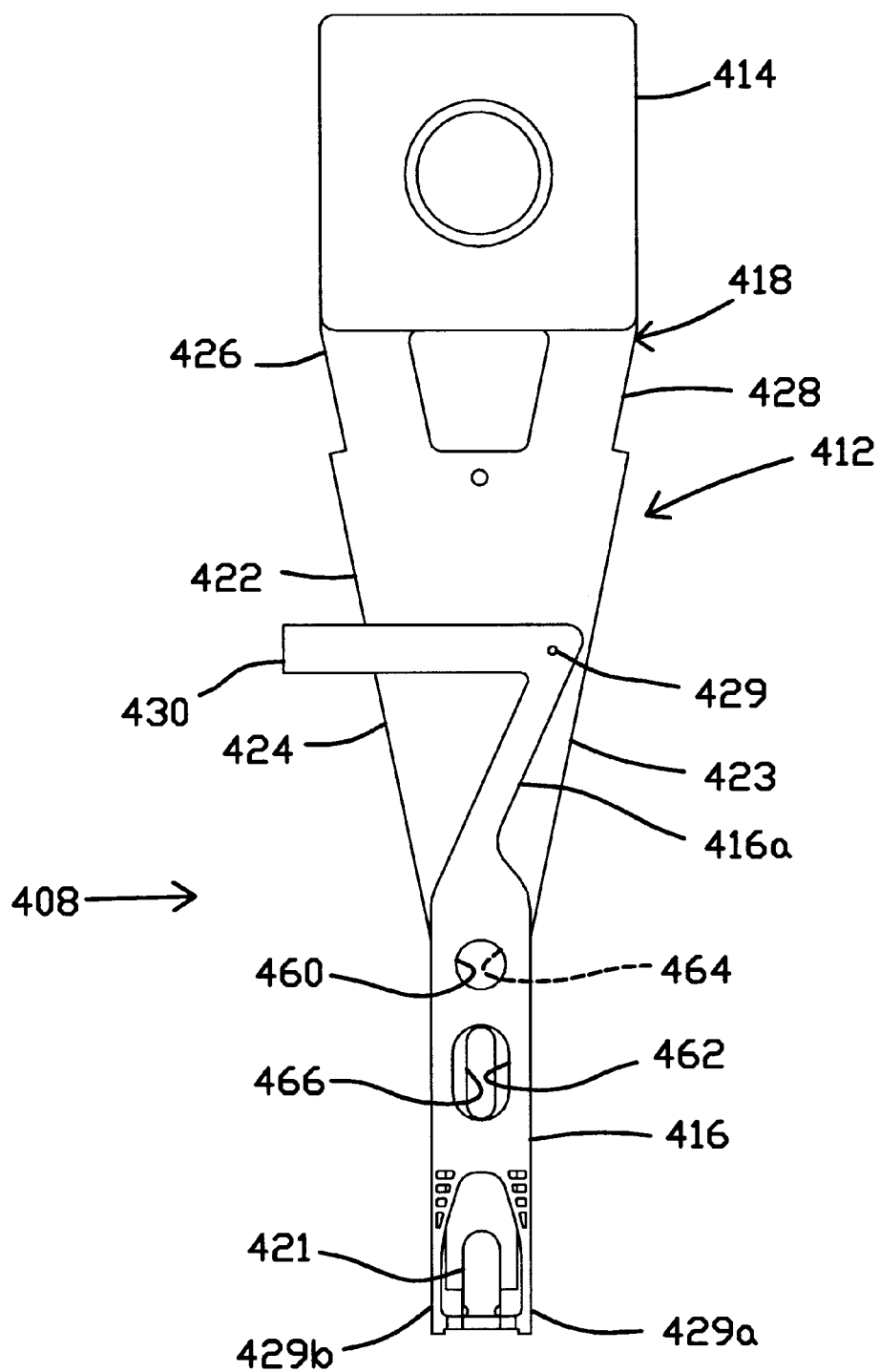
FIG. 13 is a bottom view of a fifth embodiment of a head suspension having a transversely extending vibration absorbing member formed integrally with the flexure in accordance with the present invention.

Another embodiment of a head suspension including a vibration absorbing member extending from a flexure in accordance with the present invention is shown in FIG. 13. Elements in FIG. 13 functionally similar to those of FIG. 1 are labeled with like numerals incremented by 400. Head suspension 408 includes a load beam 412 having a mounting region 414, a spring region 418 with radius arms 426 and 428, and a rigid region 422 distal to the spring region 418. First and second lateral edges 423 and 424, respectively, are at the sides of the rigid region 422. Load beam 412 also preferably includes alignment apertures 464 and 466 for alignment and mounting of flexure 416 to load beam 412. Flexure 416 preferably includes tongue 421 supported between spring arms 429a and 429b to allow for pitch and roll motion of a head slider (not shown). Flexure 416 can also include alignment apertures 460 and 462 for alignment with apertures 464 and 466, respectively, when mounting flexure 416 to load beam 412.

In the embodiment of FIG. 13, a vibration absorbing member 430 is formed integrally with flexure 416. Flexure 416 preferably includes an elongated portion 416a extending diagonally along the bottom side (shown on top in FIG. 13) of rigid region 422 to a point adjacent to lateral edge 423 of rigid region 422. Vibration absorbing member 430 preferably extends from a proximal end of elongated portion 416a of flexure 416, transversely across rigid region 422 and across lateral edge 424. Vibration absorbing member 430 is attached to load beam 412 at attachment point 429 adjacent to lateral edge 423. As vibration absorbing member 30, vibration absorbing member 430 is preferably a rectangular strip and can be laminated, having a layer of rigid material such as stainless steel, a layer of electrically insulating material, such as polyimide, and a layer of electrically conducting material such as copper.

Vibration absorbing member 430 is preferably tuned to have a longitudinal resonance mode frequency (preferably a bending resonance mode frequency) which is substantially the same as a resonance frequency of load beam 412. In the same way as vibration absorbing member 30, vibration absorbing member 430 undergoes a vibration at a resonance mode frequency substantially the same as a selected resonance mode frequency of load beam 412 to reduce the gain of vibrations at the selected resonance mode frequency in head suspension 408.

Load beam 412 can be fabricated in substantially the same manner as load beam 12. Flexure 416 including elongated portion 416a and vibration absorbing member 430 can be fabricated as one piece in substantially the same manner as flexure 216. Alignment apertures 460 and 462, tongue 421, and arms 429a and 429b can be chemically etched or otherwise formed in flexure 416. Alignment apertures 460 and 462 of flexure 416 can be used with alignment apertures 464 and 466 to accurately align and mount flexure 416 and vibration absorbing member 430 to load beam 412. Flexure 416 can be mounted to load beam 412 by adhesive, welding, or other known processes. Aligning and mounting both flexure 416 and vibration absorbing member 430 to load beam 412 simultaneously has the advantage of cutting down on manufacturing steps in fabricating head suspension 408. It has the further advantage of increasing the accuracy of alignment of vibration absorbing member 430.

Another embodiment of a head suspension including a vibration absorbing member formed integrally with a load beam in accordance with the present invention is shown in FIG. 14. Elements in FIG. 14 functionally similar to those of FIG. 1 are labeled with like numerals incremented by 500. Head suspension 508 includes a load beam 512 having a mounting region 514, a spring region 518 with radius arms 526 and 528, and a rigid region 522 distal to the spring region 518. First and second lateral edges 523 and 524, respectively, are at the sides of the rigid region 522. Load beam 512 can also include alignment apertures 564 and 566 for alignment and mounting of flexure 516 at the distal end of load beam 512.

A vibration absorbing member 530 is formed integrally with load beam 512 in the rigid region 522 thereof Vibration absorbing member 530 is a rectangular strip attached to the rigid region 522 adjacent to lateral edge 524 and extending laterally across rigid region 522 to a point adjacent to lateral edge 523. Vibration absorbing member 530 is shown coplanar with the planar surface of the rigid region 522. Vibration absorbing member 530 is preferably attached to load beam 512 on only one side and thus remains free move within the opening that defines it including the ability to pass out of the plane of the planar surface of the rigid region 522 on three sides. Vibration absorbing member 530 is preferably tuned to have a longitudinal resonance mode frequency (preferably a bending mode resonance frequency) which is preferably tuned to have a frequency which is substantially the same as a resonance frequency of load beam 512. As such, in the same way as vibration absorbing member 30, vibration absorbing member 530 undergoes a vibration at a resonance mode frequency substantially the same as a selected resonance mode frequency of load beam 512 to reduce the gain of vibrations at the selected resonance mode frequency in head suspension 508.

Forming vibration absorbing member 530 integrally with load beam 512 has the advantage of reducing the number of steps required to manufacture load beam 512. It has the further advantage of adding no additional mass to load beam 512. Therefore, disk access time can remain relatively low. Also, because vibration absorbing member 530 is contained completely within the rigid region 522 of load beam 512, the likelihood that vibration absorbing member could interfere with other components within the disk drive is reduced.

Load beam 512 can be formed in substantially the same manner as load beam 12. Vibration absorbing member 530 can be chemically etched or otherwise cut in the rigid region 522 preferably at the same time that other features, such as alignment apertures 564 and 566 are etched therein. Vibration absorbing member 530 can also be formed to lie either above or below the plane of the remainder of the rigid region 522. This can be done by providing a step at the point of connection of vibration absorbing member 530 to the remainder of the load beam.

As noted above, it is preferable that vibration absorbing member 530 be laminated having a lower layer of stainless steel, and intermediate layer of polyimide overlaying the lower layer, and an upper layer of copper or other electrical conductor overlaying the intermediate layer. To form vibration absorbing member 530 in this way, the entire load beam 512 can be formed from a laminated sheet such as that shown in FIG. 9. Either before or after forming vibration absorbing member 530, the intermediate layer and upper layer which is part of load beam 512 which does not include vibration absorbing member 530 can be stripped using known techniques.

Figure 15:
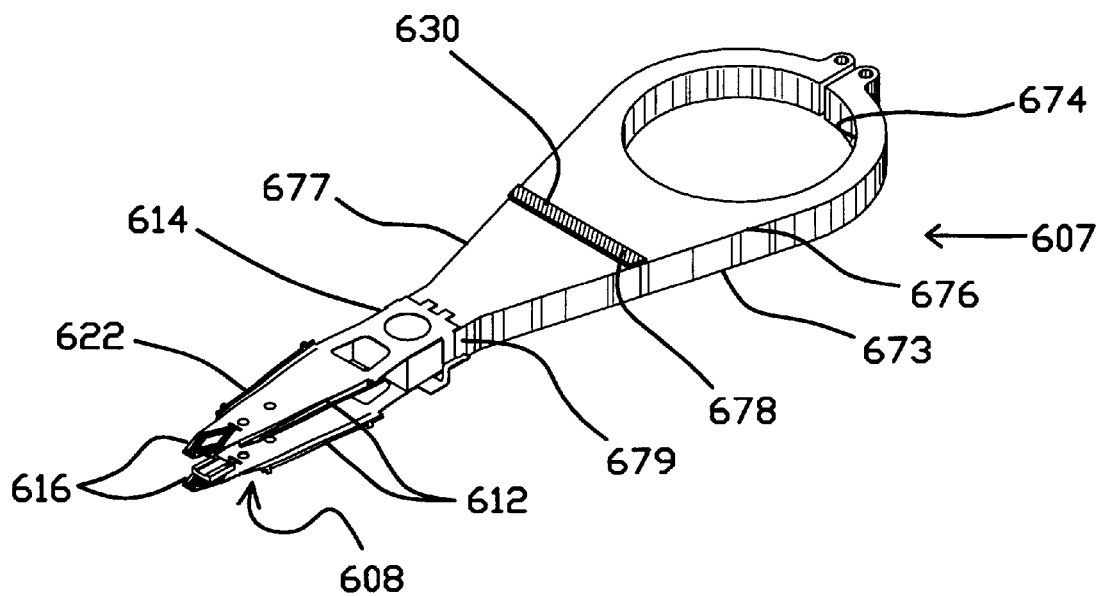
FIG. 15 is an isometric view of a seventh embodiment of a head suspension including an actuator arm having a vibration absorbing member in accordance with the present invention.

FIG. 15 shows still another embodiment of the present invention. Elements in FIG. 15 similar to those of FIG. 1 are shown with like numerals incremented by 600. FIG. 15 shows an actuator arm/head suspension combination 607 including two head suspensions 608. Head suspensions 608 each includes two load beams 612 each having flexures 616 formed integrally therewith. Load beams 612 also include mounting regions 614 at proximal ends and rigid regions 622 distal to the mounting regions 614. Head suspensions 608 are and attached to an actuator arm 673 at a mounting portion 679 thereof Actuator arm 673 is for attaching head suspension 608 to a voice coil or other type of actuator to move head suspensions 608 over the surface of a spinning disk (not shown). Actuator arm 673 includes first edge 676 and second edge 677 and can include substantially circular aperture 674 for attaching actuator arm 673 to a voice coil actuator.

In the embodiment shown in FIG. 15, actuator arm 673 includes vibration absorbing member 630 which extends transversely across actuator arm 673 from first edge 676 thereof to second edge 677 thereof Vibration absorbing member 630 is attached to actuator arm 673 at attachment point 678 adjacent to first edge 676. The remainder of vibration absorbing member 630 is free to vibrate.

Like head suspension 8, the actuator arm/head suspension combination 607 can vibrate at resonance mode frequencies at which the gain at the ends of flexures 616 where head sliders (not shown) would be mounted of a vibration input at aperture 674 is relatively large. Such vibrations of actuator arm 673 are undesirable for the same reasons that vibrations at a resonance mode frequency of head suspension 8 are undesirable, namely, such vibrations can increase data storage and retrieval times.

To reduce the gain of vibrations of the actuator arm/head suspension combination 607 at a resonance mode frequency thereof, vibration absorbing member 630 can be tuned to have a resonance mode at a frequency substantially equal to that of a resonance mode frequency of the actuator arm/head suspension combination 607. As such, in the same way as vibration absorbing member 30, vibration absorbing member 630 undergoes a vibration at a resonance mode frequency substantially the same as a selected resonance mode frequency of the actuator arm/head suspension combination 607 to reduce the gain of vibrations at the selected resonance mode frequency in actuator arm/head suspension combination 607. It is also contemplated to include a vibration absorbing member 630 on actuator arm 673 and a separate vibration absorbing member on actuator arms 608.

Actuator arm 673 can be formed from stainless steel or other relatively rigid material in a conventional manner. Vibration absorbing member 630 can also be formed from exclusively stainless steel but is preferably laminated in the same way as vibration absorbing member 30 to reduce the precision with which vibration absorbing member 630 must be trimmed. Load beams 612 can be formed simultaneously with and unitarily with flexures 616 using known processes. Load beams 612 can then be mounted to the mounting portion 679 of actuator arm 673 by welding, adhesive or other known processes.

Figure 16:
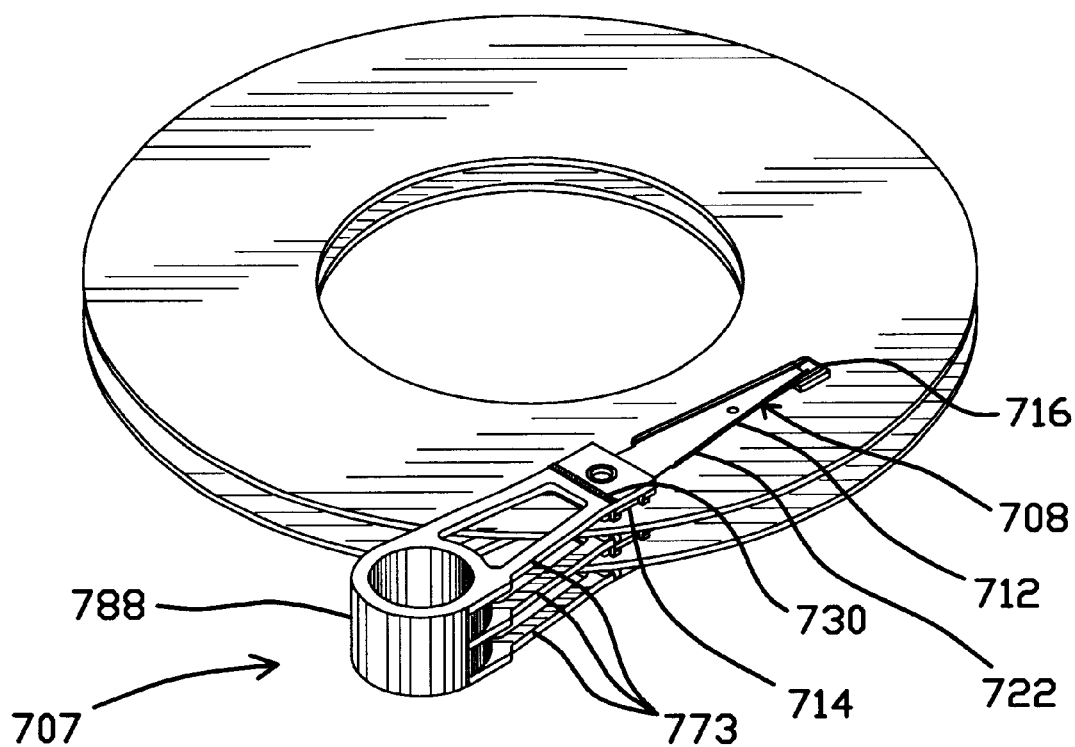
FIG. 16 is an isometric view of an eighth embodiment of a head suspension including an E-block having a plurality of actuator arms and a plurality of load beams, the E-block including at least one vibration absorbing member in accordance with the present invention.

Another embodiment of the present invention is shown in FIG. 16. Elements in FIG. 16 functionally similar to those of FIG. 15 are shown with like numerals incremented by 100. FIG. 16 shows an E-block/head suspension combination 707 for attaching multiple head suspensions 708 (only one shown) to a voice coil or other type of actuator. Each head suspension 708 has load beams 712 (only one shown) and flexures 716 (only one shown). The load beams 712 include mounting regions 714 (only one shown) at proximal ends thereof and rigid regions 722 (only one shown) distal to the mounting regions 714. An E-block 788 includes three actuator arm portions 773. It is also contemplated that E-block 788 include more or less than three actuator arm portions.

The E-block/head suspensions combination 707 can vibrate at resonance mode frequencies which have undesirably high gains. Accordingly, at least one vibration absorbing member 730 can be located on each actuator arm portion 773 to reduce the gain of such vibrations. In the embodiment shown, vibration absorbing members 730 (only one shown) extend transversely across each actuator arm portion 773.

Vibration absorbing members 730 are tuned to have a resonance mode frequency substantially equal to that of the E-block/head suspension combination 707. As such, in the same way as vibration absorbing member 30, vibration absorbing members 730 undergo a vibration at a resonance mode frequency substantially the same as a selected resonance mode frequency of E-block/head suspension combination 707 to reduce the gain of vibrations at the selected resonance mode frequency in E-block/head suspension combination 707.

E-block 788 including actuator arm portions 773 can be fabricated from stainless steel or other substantially rigid material using known procedures. Load beams 712 and flexures 716 can be fabricated in substantially the same manner as head suspension 8 and flexures 16 shown in FIG. 1. Vibration absorbing members 730 can be formed from any material including stainless steel or other substantially rigid material but are preferably laminated in the same way as vibration absorbing member 30 to reduce the precision with which the vibration absorbing members must be trimmed. Load beams 712 can then be mounted to actuator arm portions 773 of E-block 788.

Though the present invention has been described with reference to preferred embodiments, those skilled in the art will recognize that changes can be made in form and detail without departing from the spirit and scope of the invention.

What is claimed is:

1. A head suspension for supporting a head slider within a dynamic rigid disk drive, comprising:

a load beam having a mounting region at a proximal end, a rigid region spaced distally from the mounting region, and a spring region between the mounting region and the rigid region;

a flexure at a distal end of the load beam and for supporting the head slider; and at least one vibration absorbing member attached to one of the load beam and flexure and having an unattached portion extending to a free end, the vibration absorbing member being sized and shaped to have a matched resonance mode frequency that is substantially the same as a select resonance mode frequency of the head suspension, wherein the vibration absorbing member is caused to vibrate at the matched resonance mode frequency by channeling vibrations of the head suspension at the select resonance mode frequency to the vibration absorbing member, and vibration of the vibration absorbing member at the matched resonance mode frequency absorbs energy of vibration of the head suspension.

2. The head suspension of claim 1 wherein the vibration absorbing member is attached to the rigid region of the load beam.

3. The head suspension of claim 2 wherein the rigid region of the load beam has a top face and a bottom face and the vibration absorbing member is attached to the bottom face of the rigid region.

4. The head suspension of claim 2 wherein the load beam includes a first lateral edge and a second lateral edge and the vibration absorbing member extends laterally across a portion of the rigid region of the load beam and past the first lateral edge.

5. The head suspension of claim 4 wherein the load beam includes an aperture in the spring region and the vibration absorbing member is attached to the rigid region of the load beam distal to the aperture.

6. The head suspension of claim 2 wherein the load beam includes a first lateral edge and a second lateral edge and the vibration absorbing member extends diagonally across a portion of the rigid region of the load beam and past the first lateral edge.

7. The head suspension of claim 2 wherein the vibration absorbing member is a substantially rectangular strip.

8. The head suspension of claim 2 wherein the vibration absorbing member is attached to and formed unitarily with the load beam.

9. The head suspension of claim 8 wherein:

the load beam includes a first lateral edge; and the vibration absorbing member is attached to the rigid region of the load beam adjacent to the first lateral edge and extends laterally across the rigid region, the vibration absorbing member lying in a same plane as the rigid region.

10. The head suspension of claim 1 wherein the vibration absorbing member is attached to and formed unitarily with the flexure.

11. The head suspension of claim 10 further including an elongated member extending from a proximal end of the flexure longitudinally along the load beam and past the proximal end of the load beam, and wherein the vibration absorbing member extends from the elongated member diagonally across the rigid region of the load beam.

12. The head suspension of claim 10 wherein:

the load beam further includes a first lateral edge;

the flexure includes an elongated portion extending beneath the rigid region of the load beam to the first lateral edge; and the vibration absorbing member extends from the elongated portion of the flexure transversely across the rigid region of the load beam.

13. The head suspension of claim 10 wherein the vibration absorbing member extends from a proximal end of the flexure and longitudinally along the load beam.

14. The head suspension of claim 13 wherein the load beam includes an aperture in the spring region and the vibration absorbing member extends into the aperture.

15. The head suspension of claim 1 wherein the vibration absorbing member is a laminated strip.

16. The head suspension of claim 15 wherein the vibration absorbing member has three laminated layers.

17. The head suspension of claim 1 wherein the vibration absorbing member vibrates at a bending mode resonance frequency substantially the same as a first torsion mode frequency of the head suspension.

18. In combination with the head suspension of claim 1, an actuator arm having the head suspension attached thereto, and including an actuator arm vibration absorbing member mounted to the actuator arm.

19. In combination with the head suspension of claim 1, an E-block having at least one actuator arm portion with the head suspension attached thereto, and including an actuator arm vibration absorbing member attached to the actuator arm portion.

20. A head suspension and actuator arm combination wherein one of the head suspension and the actuator arm includes a vibration absorbing member wherein;

the head suspension includes;
a load beam having a mounting region at a proximal end, a rigid region spaced distally from the mounting region; and
a flexure at a distal end of the load beam and for supporting a head slider;

and the vibration absorbing member is attached to one of the head suspension and the actuator arm and includes an unattached portion that extends transversely to a free end, the vibration absorbing member being sized and shaped to have a matched resonance mode frequency that is substantially the same as a select resonance mode frequency of the head suspension and actuator arm combination, wherein the vibration absorbing member is caused to vibrate at the matched resonance mode frequency by channeling vibrations of the head suspension at the select resonance mode frequency to the vibration absorbing member, and vibration of the vibration absorbing member at the matched resonance mode frequency absorbs energy of vibration of the head suspension.

21. The head suspension and actuator arm combination of claim 20 wherein the actuator arm includes a first lateral edge and a second lateral edge and the vibration absorption member is attached to the actuator arm and extends from a location adjacent to the first lateral edge to a location adjacent to the second lateral edge.

22. A head suspension and E-block combination wherein one of the head suspension and the E-block includes a vibration absorbing member wherein;

the head suspension includes;
a load beam having a mounting region at a proximal end, a rigid region spaced distally from the mounting region; and
a flexure at a distal end of the load beam and for supporting a head slider; and the E-block includes at least one actuator arm portion to which the head suspension is mounted; and the vibration absorbing member is attached to one of the head suspension and the E-block and includes an unattached portion that extends transversely to a free end, the vibration absorbing member being sized and shaped to have a matched resonance mode frequency that is substantially the same as a select resonance mode frequency of the head suspension and E-block combination, wherein the vibration absorbing member is caused to vibrate at the matched resonance mode frequency by channeling vibrations of the head suspension at the select resonance mode frequency to the vibration absorbing member, and vibration of the vibration absorbing member at the matched resonance mode frequency absorbs energy of vibration of the head suspension.

* * * * *